United States Patent Office 2,883,347
Patented Apr. 21, 1959

2,883,347

FORMATION OF EXPANDED SILICA SPHERES

Joseph R. Fisher, Chatham, and Merle D. Rigterink, Basking Ridge, N.J., assignors to Bell Telephone Laboratories, Incorporated, New York, N.Y., a corporation of New York No Drawing. Application September 13, 1955
Serial No. 534,152

3 Claims. (Cl. 252—502)

This invention relates to a method for manufacturing expanded silica spheroids of controlled density, to expanded silica spheroids so produced, to methods of producing microphone granules from such spheroids, and to such granules themselves.

At present in the art of telephony, roasted anthracite particles are widely used as the granular microphonic material in apparatus such as telephone transmitters. Earlier research has been done to find other substances which would be satisfactory replacements for such granules, and spheroids of refractory substances coated with thin conducting carbon films have been considered.

As a base material on which to deposit carbon, fused silica has shown itself useful. Fused silica is sufficiently refractory to withstand the high temperatures and reducing atmospheres necessary to deposit carbon films thereon. Most other glass or ceramic compositions become tacky, or melt down, or are unstable under the conditions required for carbon deposition.

Fused silica, further, has a low thermal expansion, and, consequently, a high thermal shock resistance. Such properties permit rapid heating and cooling during carbon deposition without danger of cracking. The carbon deposits laid on fused silica have a high adherence to the silica surface, also.

One disadvantage in the use of fused silica heretofore in the art was the limited density available in the resultant product. If the fused silica spheroids were made from rock quartz, or from crystalline or amorphous sands, the resultant fused product had an essentially invariant density of 2.2 grams per cubic centimeter. Much lighter fused silica spheroids can be produced by the method of C. J. Christensen, F. S. Goucher and H. G. Wehe, taught in Patent No. 2,151,083, issued to the inventors named on March 21, 1939. In the method there taught, silica gels, rather than the more conventional siliceous materials, are used as a source of silica. Water, associated with the silica in the gel, is vaporized by passing granules of the gel through the high-temperature flame of an atomic hydrogen torch. The vapor expands the silica, producing voids within the silica spheres formed in the high-temperature arc. The resultant spheres, with voids entrapped therein, have densities between approximately 0.5 gram per cubic centimeter and 0.7 gram per cubic centimeter.

Prior to the techniques of the present invention, the production of fused silica with densities intermediate to the extreme values found in the light material formed from silica gel and the heavy material formed from rock quartz or sands was unknown to the art. Yet, fused silica spheres of such intermediate density are perhaps most useful in the telephone art. The anthracite grains now in use in microphones have a density of 1.7 grams per cubic centimeter. Replacement of anthracite by another material, without necessitating extensive redesign of present equipment, would be easiest using a substitute of about the same density. Some slight adjustment of bulk density is usually made when regular spheroids are used to replace the irregular anthracite particles in transmitters because of differences in packing. The density of fused silica used as a substitute for the anthracite particles should preferably have an approximate density of 1.5 grams per cubic centimeter.

In the present invention, a new method of producing expanded silica has been devised. Using the method, silica spheroids of a density of about 1.5 grams per cubic centimeter, found useful in the telephone arts, can be produced consistently. The method can also be used, however, to produce expanded silica having any density intermediate to about 0.5 gram per cubic centimeter and 2.2 grams per cubic centimeter. Such silica bodies also have useful purposes other than as microphonic materials.

For example, expanded silica may be blended with lower-melting glasses into an inorganic insulating material of low dielectric constant. The dielectric constant of fused silica, about 4.0, is lowered by the inclusion of air, of a much lower dielectric constant, therein. Mixing of the air-infused silica particles with a binder or matrix of compatible glasses produces a rigid inorganic insulator with a favorable low dielectric constant. Such a mixture, shaped by casting, pressing, or extrusion, has many possible uses as a thermal shock-resistant insulating material in manufacturing radomes, dielectric lenses, or supports in electron tubes and other electrical equipment.

In the method of the invention herein disclosed, three forms of silica, fused quartz, silica gel, and colloidal silica, are mixed, dried, and screened to form irregular particles of the rough size desired. The screened material is fired at a controlled temperature to remove water loosely bound with the silica. Finally, by passing the fired granules through an atomic hydrogen arc, fusion sufficient to spheroidize the granules takes place. If the particles are to be used as microphone material, they can then be carbon coated. Other appropriate procedures, such as mixing and fusing with powdered glass, may be used if an insulating substance, or other products, are to be developed.

Density control of the finally-obtained expanded silica can be exercised at two stages of the process mentioned above. The density of the final material is perhaps most strongly affected by the choice of starting materials, and in particular, by the ratio of fused quartz to silica gel used in the forming mixture. Density control may also be exercised at the firing stage prior to spheroidizing in an atomic hydrogen arc. A stepwise consideration of the process, and discussion of the role played by the components of the forming mixture should illustrate the effect of each one on the density of the product.

Fused quartz (fused silica, quartz glass, vitreous silica) is used as the high-density component in the forming mixture. The fused material, which is an amorphous, glassy variety of silica, can be prepared by fusion of crystalline forms of the same substance. Because of the allotropy of silica and the possible existence of two or more allotropes in silica heated to a high temperature, the melting point of quartz is uncertain. Solid bodies have been reported to begin softening at about 1100° C. However, considerably higher temperatures, depending on the speed of fusion desired, are probably required to accomplish complete fusion of silica, or of, at least, the stable low-temperature form, quartz. Such fused quartz, containing no appreciable chemically-bound water is, chemically, in a form similar to the silica eventually to be found in the resultant product. This similarity facilitates rapid fusion of mixtures in which the fused quartz is a major ingredient. Further, the excellent infra-red transmitting properties of fused quartz undoubtedly aid in bringing about the rapid fusion desired in the spheroidizing step. Either clear fused quartz or opaque fused quartz may be used. The latter is cheaper and may lead also to a desirable slight decrease in density when substituted for the clear material in a given preparatory process.

The use of fused quartz as the sole component in the production of silica spheroids would lead to the development of a product with the density of vitreous silica, about 2.2 grams per cubic centimeter. A second component, silica gel, is, in this invention, mixed with the fused quartz to bring about a modification of the density.

Silica gel is a form of silicon dioxide which is extremely porous and which contains water chemically bound and trapped within the porous structure. The density of silica gel is about 2.0 grams per cubic centimeter. If the gel is expanded according to the method taught in the Christensen et al. Patent, No. 2,151,083, mentioned earlier, a material with a density about one-half to one-third of this value is obtained.

Silica gel, which may be obtained by acid-induced precipitation of silica from solutions of soluble silicates, is thought to have a variable amount of water associated with the silicon dioxide therein. Release of this water, during the spheroidizing taught in the patent referred to, causes tumescence or puffing of the silica, and leads to fused material of the very low densities mentioned.

Not all the water in silica gel is bound with equal tenacity in the porous structure of this material however. It has been found possible, by a firing at temperatures below those found in an atomic hydrogen arc, to remove substantial portions of the more-loosely bound water. The remaining water in the structure will then form voids upon spheroidizing which are more homogeneously distributed throughout the fused material. The voids, further, are of smaller size, and have less tendency to break through the sphere wall. Finally, better control over void formation can be obtained by this process of driving off indeterminate and variable amounts of loosely-bound water in a firing preliminary to spheroidizing. A more constant amount of tightly-bound water remains in the gel. This more uniform water content leads to greater reproducibility and uniformity of the product.

More importantly, it has been discovered that the density of fused silica spheroids produced by expansion in an atomic hydrogen arc can be determined by using a mixture of fused quartz, as a high-density component, and silica gel, as the material furnishing the water vapor responsible for the expansion. The higher the ratio of fused quartz to silica gel, the closer the approach of the product's density value to 2.2 grams per cubic centimeter, the density of fused quartz or vitreous silica. The lower the ratio of fused quartz to silica gel, the more closely do the product densities approach those of the buoyant structures taught by Christensen et al. in the Patent No. 2,151,038. By varying the ratio at intermediate values, fused silica spheroids with densities between the values of approximately 0.05 gram per cubic centimeter and 2.2 grams per cubic centimeter can be readily obtained.

The third component of the forming mixture described herein, colloidal silica, is used as a binder in the fused quartz-silica gel mixture. Since the colloidal silica functions primarily as a non-contaminating binder for the other ingredients, its proportion in the forming mixtures remains essentially constant, though the ratio of fused quartz to silica gel is varied.

The compositions found most advantageous for obtaining the density of 1.5 grams per cubic centimeter desired in microphone granules contain the following proportions, by weight, of the three ingredients mentioned:

| | Parts |
|---|---|
| Powdered fused quartz | 60 |
| Powdered silica gel | 42 |
| Colloidal silica (18 percent suspension in water) | 8 |

In such a mixture, the ratio of fused quartz to silica gel is slightly over 1.4 to 1. When this ratio is increased, as mentioned, the density of the spheres produced approaches 2.2 grams per cubic centimeter. As the ratio decreases, the silica gel predominates, and a low density, highly porous structure results.

For the spheres contemplated for possible use in telephone apparatus, the range of densities most usually desired is obtained when the composition of the siliceous mixture falls within the following limits:

| | Parts by weight |
|---|---|
| Powdered fused quartz | 50–70 |
| Powdered silica gel | 30–50 |
| Colloidal silica (18 percent suspension in water) | 4–12 |

For other application, where a wider selection of densities in the fused silica spheres may be desired, compositions falling within the values given below are preferred:

| | Parts by weight |
|---|---|
| Powdered fused quartz | 40–80 |
| Powdered silica gel | 20–60 |
| Colloidal silica (18 percent suspension in water) | 4–12 |

Though, as mentioned, the ratio of fused quartz to silica gel in the mixtures may vary between zero and infinity, from a practical viewpoint spheres whose densities encompass nearly all values of interest are obtainable when the compositions of the forming mixture lie within the ranges immediately following:

| | Parts by weight |
|---|---|
| Powdered fused quartz | 10–90 |
| Powdered silica gel | 10–90 |
| Colloidal silica (18 percent suspension in water) | 4–12 |

As a very rough rule of thumb, the product density may be considered as a linear function of the percentage of fused quartz present in the mixture of fused quartz and silica gel. The empirical relationship $$\rho = 0.5 + 0.017P$$

where $\rho$=density in grams per cubic centimeter and $P$=percent fused quartz in the fused quartz-silica gel mixture, will make it possible to gauge the approximate relative proportions of fused quartz and silica gel to be mixed for a desired density. Other factors, namely, the alkali metal ion content of the silica gel used and the extent to which the gel-containing mixtures are fired before spheroidizing, are also important factors in determining density, however, and may modify the composition estimated from the empirical expression given above. These other factors are considered below. Once standardized, the process will permit spheres whose densities are reproducible to within ±0.3 grams per cubic centimeter to be manufactured.

For the total weight, 102 parts, of fused quartz and silica gel mentioned, 8 parts by weight of colloidal silica, in suspension, have been found to give sufficient binding action, independent of the relative amounts of fused quartz to silica gel present.

In the process of forming fused silica spheres, the silica gel and fused quartz are generally mixed as solids. These ingredients are to be finely ground to permit the intimate mixing required for homogeneity in the final product. Both the mentioned ingredients are preferably powdered to pass at least a 325 mesh sieve, or equivalent, having screen openings of 0.044 millimeter as specified by the United States Standard Screen Scale. Thorough mixing of the ingredients is conveniently accomplished by ball-milling the dry ingredients for about an hour.

The colloidal silica used as a binder is next added, conveniently as an aqueous suspension in water containing 18 percent of silica. Such a suspension has been available commercially under the trade name "Nalcoag," from the National Aluminate Corporation. Other suspensions, higher in silica content, may also be obtained and diluted to about 18 percent strength if desired.

Mixing of the ball-milled ingredients with the colloidal silica is conveniently continued in a double motion paddle mixer until the mixture begins to dry and balls up. The consistency is then adequate for granulating. The granulation is effected by forcing the mixture through 10 mesh, 20 mesh, and 40 mesh sieves, respectively, when the mixture is to be used in forming spheres for microphonic material. The 10 mesh, 20 mesh and 40 mesh standard screens mentioned above have mesh openings, respectively, of 2.00 millimeters, 0.84 millimeter, and 0.42 millimeter. Larger or smaller spheres may be formed at discretion if large enough arcs to spheroidize properly, or some other spheroidizing techniques, are available. It is only necessary to use the screen size, in this step, most consistent with the particle size desired.

The sized material is now thoroughly dried, either at room temperature by simple air drying, or in an oven, conveniently set at about 110° C. After drying, a final sieving to remove fines passing through an 80 mesh standard screen, with a sieve opening of 0.177 millimeter, is done. The large granules remaining on the screen are then fired at elevated temperatures, prior to spheroidizing.

This firing accomplishes a dual purpose. By tending to agglomerate the colloidal silica in the forming mixture, the firing activates the operation of the colloidal silica as a binder. Secondly, the firing removes all but the most tenacious chemically-bound water from the silica gel, leaving a residue therein which is fairly constant from mixture to mixture so treated if the same source of silica gel is relied upon.

The ease with which this last-removed, most tightly bound water leaves the gel is dependent on the impurity content of the gel, which content is generally dependent on the preparatory method use in making the gel.

The pore volume of silica gel, which is a measure of the water bound in the gel, usually decreases fairly rapidly if the gel is heated at elevated temperatures above about 400° C. to 600° C. At such temperature, the porous structure "collapses," with the pore volume decreasing to a negligible quantity, and a dense compact, amorphous material without bound water is obtained. A "collapse" of the silica gel and removal of water therefrom before the spheroidizing step in the present invention would be undesirable. Dense structures without the expansion due to trapped water would ensue. A silica gel should be used which will not collapse at a temperature of about 1000° C., at which the binder becomes cohesive. Yet, at these temperatures, the gel should lose substantially all water but the tightly-bound water preventing collapse.

The collapse temperature of a silica gel is apparently to be correlated with the quantity of alkali metal ion impurity trapped in the gel. Gels prepared by precipitation from soluble alkali metal silicates generally show the lowest collapse temperatures, dependent to some extent also on the temperature of gel formation, the extent of washing, and other techniques known in the art.

For the purposes of the present invention, where collapse temperatures higher than 1000° C. are preferred, the best sources of silica gel are organic silicates. These silicates, such as tetraethyl orthosilicate or ethyl polysilicate, preferably the former, can be hydrolyzed to form silica gels uncontaminated by excessive amounts of alkali metal ions. Silica gels obtained by these methods have been employed most successfully in the practice of the present invention.

The temperature of the firing preliminary to spheroidizing is, as mentioned, about 1000° C. Much lower temperatures will not agglomerate the binder. Temperatures higher than about 1200° C. will tend either to collapse the silica gels or to encourage the devitrification of the fused quartz.

The time of firing is also to be chosen with an eye to preventing collapse of the gel. Extended firing, even at low temperatures, will tend to remove chemically-bound water and destroy the gel's porosity. Generally, heating times between 1 hour and 16 hours have been found best. With the gels formed from organic silicates, as mentioned, a four hour firing at 1100° C. has been found to give good binding by the colloidal silica binder without leading to collapse of the silica gel structure.

The silica gel, formed by the hydrolysis of organic silicates, may contain entrapped organic hydrolysis products. On firing, the desired firing temperature should be approached slowly to aid the burning out of these organic substances. Too rapid approach to the firing temperature may carbonize the organic impurities in the gel, possibly leading to the presence of small carbon particles admixed with the fired silica granules.

During firing, the individual granules may form agglomerates of a size larger than desired. These agglomerates are easily broken apart, but a second screening for size is usually made to remove fines resulting from crushing and also any large unbroken aggregates. For microphone granules this second screening is usually made to remove particles larger than those passing a 40 mesh United States Standard Screen, and fines passing an 80 mesh United States Standard Screen. If closer size control is desired, the fraction passing a 50 mesh United States Standard Screen, with mesh openings of 0.30 millimeter, and the fraction being retained on a 70 mesh United States Standard Screen, with mesh openings of 0.21 millimeter, can be separated. During these sizing operations, the fired colloidal silica acts as a binder for the cold material.

After this second sorting for size, the particles are spheroidized by passing through an atomic hydrogen arc. As known in the art, the particles are dispensed from a container and are permitted to fall freely through the arc, in which temperatures over 2000° C. are reached. The granules are fused on passing through the arc and are spheroidized by surface tension during free fall while molten. The water bound within the silica gel component of the mixture composing the granules is vaporized at arc temperatures and expands forming microvoids within the spheroidized particle. The relatively small amounts of water remaining in the granules after the firing which precedes spheroidizing aids the formation of many small voids, smaller on the average than those resulting from spheroidizing silica gel unmixed with fused quartz and not fired before being spheroidized. The creation of small voids, further, reduces tendencies to irregular sphere formation and reduces the number of open pores pocking the surface of the spheres.

The larger the cross section of the electrodes of the hydrogen arc, the larger will be the zone in which temperatures sufficient to fuse the spheres dropping through the arc. A large heat zone permits a greater number of small particles to be produced in unit time, and also allows larger spheres to be produced by the method. A 50-ampere arc between 3/32 inch diameter electrodes has been found sufficient to spheroidize microphone granules of the size range earlier described.

As is known in the art, the high temperatures achieved in an atomic hydrogen arc are produced by the reformation, with the liberation of energy, of hydrogen molecules from hydrogen atoms. The atoms are obtained by dissociation of gaseous molecular hydrogen with a high energy electric current.

After spheroidizing, the expanded particles may be again sized by screening. A fractionation by density may also be accomplished by floating in liquids of varying density.

If the spheres are to be adapted to the production of microphone granules, they may be carbon coated, as, for instance, by the method taught in the patent granted September 18, 1934, to Goucher et al., No. 1,973,703. In the process there taught, a carbonaceous gas, such as methane, is passed over the particles to be coated in a heating chamber kept at a temperature in the neighborhood of 1000° C.

What is claimed is:

1. The method of producing expanded silica granules which comprises granulating an initial mixture of powdered fused quartz, powered silica gel free from alkali metal ions and a suspension of colloidal silica in water, drying the resulting granules to remove free water from the mixture, firing said granules at a temperature between 1000° C. and 1200° C. to remove loosely bound water from the silica gel and to bond the particles of which the granules are formed, and then dropping said granules through a zone maintained at a temperature of at least 2000° C. to fuse and spheroidize them and to cause the tightly bound water of the silica gel to be released so as to create small voids within the granules, the proportions of the various forms of silica in said initial mixture being between 10 parts and 90 parts by weight of fused quartz, between 10 parts and 90 parts by weight of silica gel and between about .7 part and about 2.2 parts by weight of colloidal silica.

2. The method of producing expanded silica granules which comprises granulating a mixture of 10 parts to 90 parts by weight of powdered fused quartz, 10 parts to 90 parts by weight of powdered silica gel free from alkali metal ions and 4 parts to 12 parts by weight of an 18 percent by weight suspension of colloidal silica in water, drying the resulting granules to remove free water from the mixture, firing said granules at a temperature between 1000° C. and 1200° C. to remove loosely bound water from the silica gel and to bond the particles of which the granules are formed, and then dropping said granules through an atomic hydrogen arc to fuse and spheroidize them and to cause the tightly bound water of the silica gel to be released so as to create small voids within the granules.

3. The method of making a microphonic material which comprises granulating a mixture of powdered fused quartz, powdered silica gel and a suspension of colloidal silica in water, drying the resulting granules to remove free water from the mixture, firing said granules for about 4 hours at about 1100° C. to remove loosely bound water from the silica gel and to bond the particles of which the granules are formed, dropping said fired granules through an atomic hydrogen arc to fuse and spheroidize them and to cause the tightly bound water of the silica gel to be released so as to create small voids within the granules, and then coating said granules with a microphonic layer of carbon, the amount of colloidal silica present in said initial mixture being about 1.4 parts by weight per 102 parts by weight of the mixture of fused quartz and silica gel, the fused quartz and silica gel being present in proportions relative to one another of between 40 parts and 80 parts by weight of fused quartz and between 20 parts and 60 parts by weight of silica gel, the silica gel having a collapse temperature above said firing temperature.

References Cited in the file of this patent

UNITED STATES PATENTS

| 1,973,703 | Goucher et al. | Sept. 18, 1934 |
| 2,151,083 | Christensen et al. | Mar. 21, 1939 |
| 2,348,045 | Wooten | May 2, 1944 |